United States Patent
Tin (10) Patent No.: US 7,397,582 B2
(45) Date of Patent: Jul. 8, 2008

(54) COLOR CHARACTERIZATION WITH ENHANCED PURITY

(75) Inventor: Siu-Kei Tin, Milpitas, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 811 days.

(21) Appl. No.: 10/840,307

(22) Filed: May 6, 2004

(65) Prior Publication Data

US 2005/0248781 A1 Nov. 10, 2005

(51) Int. Cl.
*H04N 1/40* (2006.01)

(52) U.S. Cl. .................... 358/2.1; 358/504; 382/162

(58) Field of Classification Search .................. 358/1.9, 358/2.1, 500, 504, 468; 382/162, 167
See application file for complete search history.

(56) References Cited

U.S. PATENT DOCUMENTS

| | | | |
|---|---|---|---|
| 5,268,754 A | 12/1993 | Van de Capelle et al. | 358/527 |
| 5,739,928 A | 4/1998 | Scott | 358/520 |
| 5,786,908 A | 7/1998 | Liang | 358/518 |
| 5,948,575 A | 9/1999 | Roosen | 430/7 |
| 6,668,079 B2 | 12/2003 | Takemoto | 382/167 |
| 6,919,975 B1 | 7/2005 | Haikin et al. | 358/518 |
| 7,154,636 B2 | 12/2006 | Haikin et al. | 358/1.9 |
| 2003/0053682 A1 | 3/2003 | Haikin et al. | 382/162 |
| 2003/0098986 A1 | 5/2003 | Pop | 358/1.9 |
| 2003/0123072 A1 | 7/2003 | Spronk | 358/1.9 |
| 2003/0147088 A1 | 8/2003 | Kulkarni | 358/1.9 |
| 2004/0004731 A1 | 1/2004 | Itagaki | 358/1.9 |

OTHER PUBLICATIONS

Press, W.H, Flannery, B.P., Teukolsky, S.A. and Vetterling W.T., *Numerical Recipes in C: The Art of Scientific Computing*, 2nd Ed., Cambridge University Press (1993).
Dennis, J.E. and Schabel, R.B., *Numerical Methods for Unconstrained Optimization and Nonlinear Equations*, Prentice Hall (1983).

*Primary Examiner*—Thomas D Lee
*Assistant Examiner*—Stephen Brinich
(74) *Attorney, Agent, or Firm*—Fitzpatrick, Cella, Harper & Scinto (57) ABSTRACT

The present invention creates a color transform for transforming color image data from a device-independent color space to a device-dependent color space of a color device. A forward model is accessed which transforms color image data from the device-dependent color space to the device-independent color space. The forward model is iteratively inverted to obtain a plurality of distinct device-dependent data point value sets, wherein the device-dependent data point value sets are colorimetrically identical to each other in the device-independent color space. One device-dependent data point value set is then selected from the plurality of distinct device-dependent data point value sets based on the application of a color purity function to the plurality of distinct device-dependent data point value sets. The color transform is populated with the selected device-dependent data point value set. Because one device-dependent data point value set is selected from the plurality of obtained distinct device-dependent data point value sets based on the application of a color purity function, the inverse color transform provides the best color estimate among all color candidates that are colorimetrically equivalent, and accurately recovers original device-dependent color space values.

37 Claims, 6 Drawing Sheets

COLOR CHARACTERIZATION WITH ENHANCED PURITY

BACKGROUND OF THE INVENTION

1. Field of the Invention

This invention generally relates to the field of color characterization of output devices, and specifically relates to generation and use of a color transform for mapping colors from a device-independent color space to a device-dependent color space. The transform provides one-to-one mappings of colorimetrically accurate colors with enhanced color purity in the device-dependent color space.

2. Description of the Related Art

In general, color characterization of output devices consists of generating a target consisting of color patches to effect a sampling of the gamut of the color device, and then building a source map (or forward model) from the device-dependent color space of the device to a device-independent color space based on the target of patches. To generate a destination map (or inverse model), defined as a map from the device-independent color space back to the device-dependent color space, the process of inversion of the forward model is required.

A commonly occurring phenomenon encountered during the inversion of a forward model is that two or more different original device-dependent color values may result in the same, or colorimetrically equivalent, value in the device-independent color space. That is, there is in general no one-to-one correspondence between device-dependent and device-independent values of the forward model.

There are situations where one value, or solution, is preferred over others. As an example, in a device-dependent color space such as RGB, an RGB solution of exactly RGB=(0,0,0) or RGB=(255,255,255) as values is preferred over one that has intermediate values falling in between 0 and 255. Among other things, a value of 0 or 255 does not need to be dithered on a halftone printer, a desirable feature if one is trying to print black text, for example. Another reason is to achieve the exact inverse of the forward model so that when the forward model is applied followed by the inverse model, the original RGB value is recovered.

A need therefore arises in a case where two or more different original device-dependent color values result in the same or colorimetrically equivalent value in the device-independent color space, for determining which of the two or more values is preferred.

SUMMARY OF THE INVENTION

The present invention addresses the foregoing need by constructing a color transform with enhanced purity. In particular, the invention iteratively inverts a forward model to obtain a plurality of device-dependent data point value sets, and selects one device-dependent data point value set based on the application of a color purity function. The color transform is populated with the selected device-dependent data point value set.

In one aspect, the present invention creates a color transform for transforming color image data from a device-independent color space to a device-dependent color space of a color device. A forward model is accessed which transforms color image data from the device-dependent color space to the device-independent color space. The forward model is iteratively inverted to obtain a plurality of distinct device-dependent data point value sets, where in the device-dependent data point value sets are colorimetrically identical to each other in the device-independent color space. One device-dependent data point value set is then selected from the plurality of distinct device-dependent data point value sets based on the application of a color purity function to the plurality of distinct device-dependent data point value sets. The color transform is populated with the selected device-dependent data point value set.

Preferably, the color transform is usable by a color management system. The step of iteratively inverting the forward model preferably comprises performing an iterative algorithm using device-independent data points from the forward model and using a plurality of different seed value sets to obtain the plurality of distinct device-dependent data point value sets.

The preferred iterative algorithm is a Newton-Raphson iterative algorithm. The steps of accessing, iteratively inverting, selecting and populating are repeatedly performed to further populate the color transform. The color purity function is based on a proximity of the distinct device-dependent data point value sets to a boundary of the device-dependent color space. In addition, the color transform creates a mapping from the device-independent color space to the device-dependent color space. The device-dependent color space is preferably RGB, and the device-independent color space is preferably CIELUV. The color device can be a printer or a monitor.

In another aspect, the present invention creates an inverse color transform for transforming color image data from a device-independent color space of a color device to a device-dependent color space. A forward model is accessed which transforms color image data from the device-dependent color space to the device-independent color space. An iterative algorithm is then performed using predesignated initial device-dependent data point values and using device-independent data points from the forward model to obtain first output device-dependent data point values. Next, new initial device-dependent data point values are generated based on the obtained first output device-dependent data point values. The iterative algorithm is again performed using the generated new initial device-dependent data point values and using device-independent data point values from the forward model to obtain second output device-dependent data point values. A selection is then made between the first output device-dependent data point values and the second output device-dependent data point values based on the application of a color purity function to the first output device-dependent data point values and the second output device-dependent data point values. The inverse color transform is populated with the selected device-dependent data point values.

Preferably, the iterative algorithm is performed on one set of predesignated initial device-dependent data point values selected from a plurality of sets of predesignated initial device-dependent data point values. The repetition of the iterative algorithm is performed based on a new seed value set (also called an "initial value") which is moved more closely to a pure color value.

The inverse color transform is also usable by a color management system. The preferred iterative algorithm is a Newton-Raphson iterative algorithm. The steps of accessing, performing, generating, performing, selecting and populating are repeatedly performed to further populate the inverse color transform. The color purity function is based on a proximity of the first output device-dependent data point values and the second output device-dependent data point values to a boundary of the device-dependent color space. In addition, the inverse color transform creates a one-to-one mapping from the device-independent color space to the device-dependent color space. The device-dependent color space is preferably RGB, and the device-independent color space is preferably CIELUV. The color device can be a printer or a monitor.

Because the present invention selects a device-dependent data point value set from a plurality of obtained device-dependent data point value sets based on the application of a color purity function, a better color estimate among all color candidates that are colorimetrically equivalent is provided. In addition, a nearly exact inverse of the forward model is achieved, so that when the forward model is applied followed by the inverse model, the original device-dependent color space values are recovered.

This brief summary has been provided so that the nature of the invention may be understood quickly. A more complete understanding of the invention can be obtained by reference to the following detailed description of one preferred embodiment thereof in connection with the attached drawings.

DETAILED DESCRIPTION OF THE INVENTION

Figure 1:
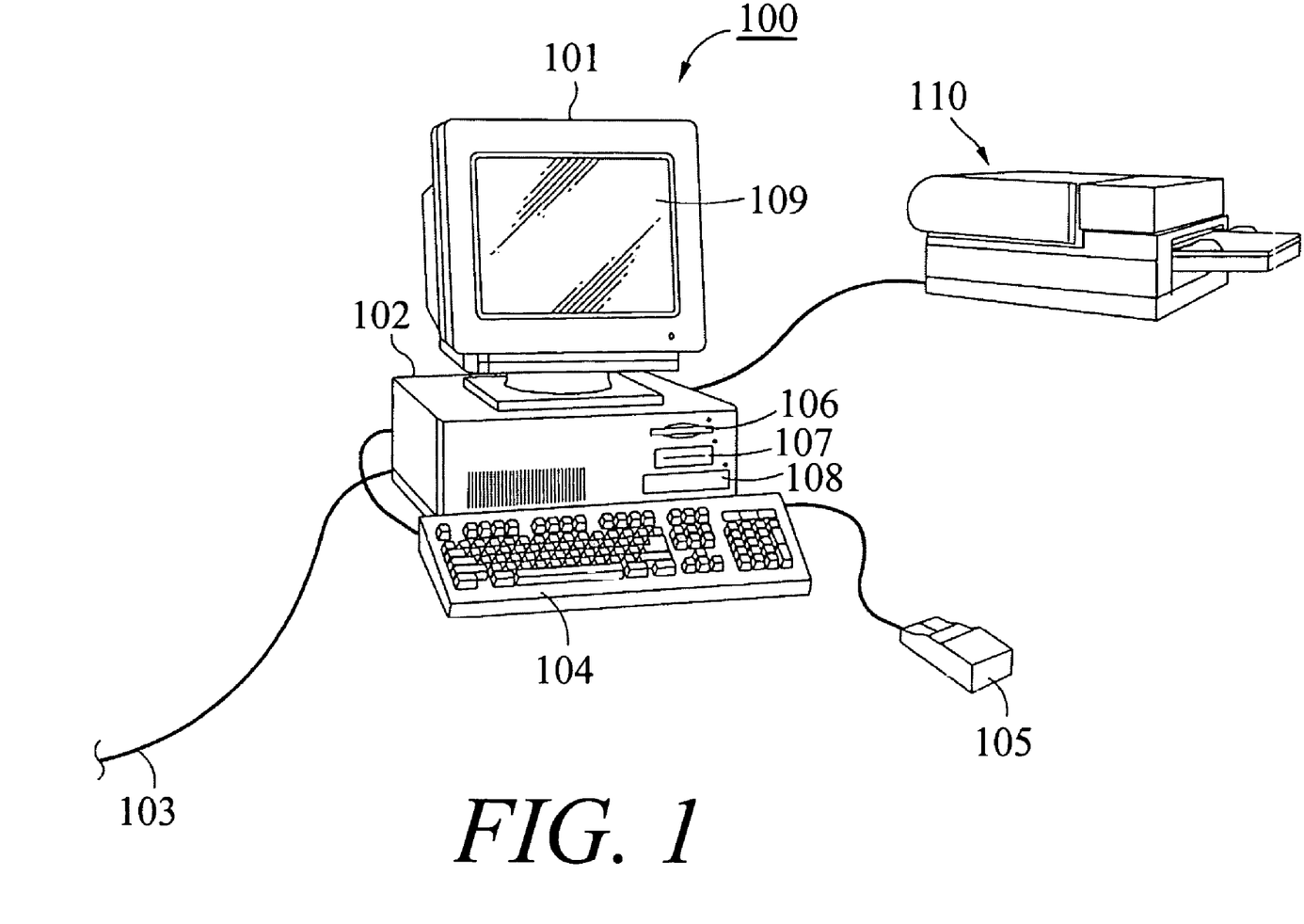
FIG. 1 is a view showing the appearance of one embodiment of the invention.

Referring to FIG. 1, a view showing the exterior appearance of one embodiment of the invention is shown. Specifically, FIG. 1 depicts computing equipment 100, which includes host processor 102 which comprises a personal computer (hereinafter "PC"). Provided with computing equipment 100 are color monitor 101 including display screen 109 for displaying text and images to a user, keyboard 104 for entering text data and user commands into PC 102, and pointing device 105. Pointing device 105 preferably comprises a mouse, for pointing, selecting and manipulating objects displayed on display screen 109.

Computing equipment 100 includes a computer readable memory medium such as floppy disk drive 106, fixed disk 108, and/or CD-ROM drive 107. Such computer readable memory media allow computing equipment 100 to access information such as image data, computer-executable process steps, application programs, and the like, stored on removable and non-removable memory media. In addition, network access 103 allows computing equipment 100 to acquire information, images and application programs from other sources, such as a local area network or the Internet.

Printer 110 is a color output device for which a color transform can be created, such as an ink jet printer or color laser beam printer. While printer 110 is shown as being directly connected to PC 102, it need not be. Printer 110 may be connected via a network (e.g., wired or wireless network, not shown), for example.

Figure 2:
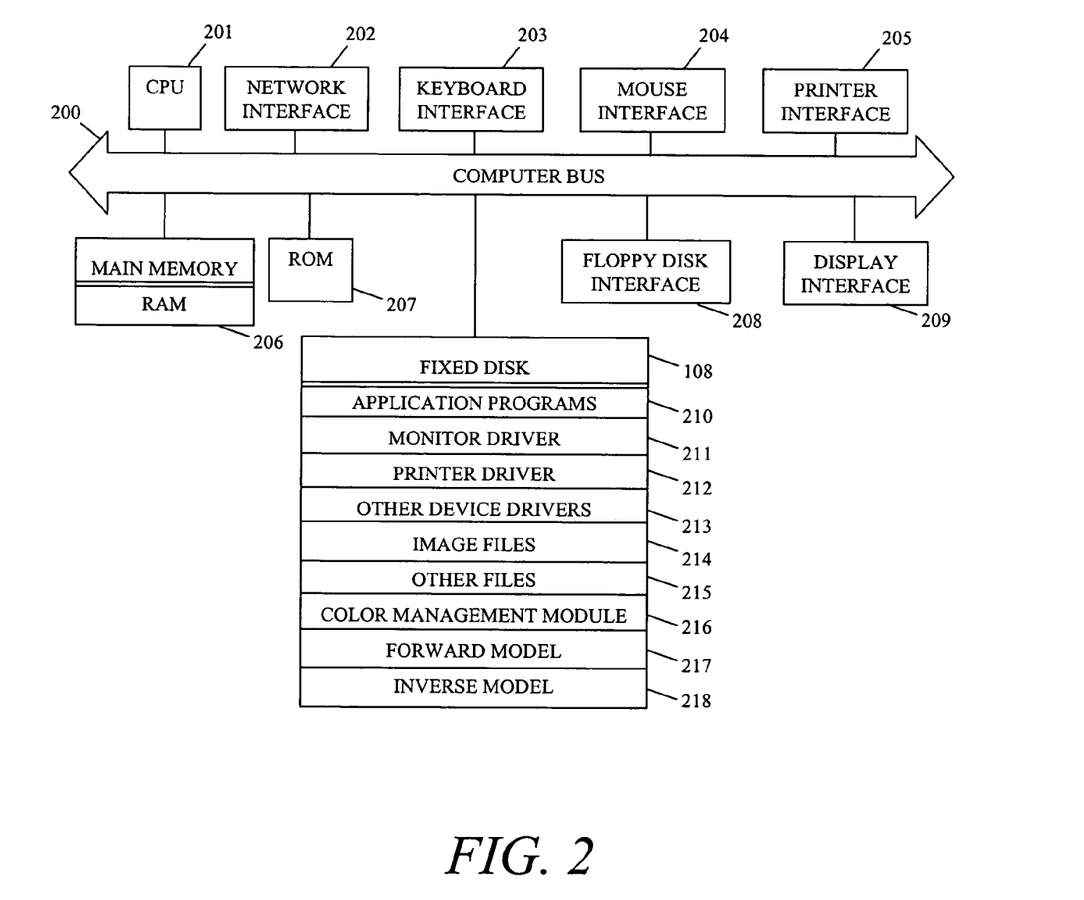
FIG. 2 is a block diagram depicting an example of an internal architecture of the FIG. 1 embodiment.

FIG. 2 is a block diagram illustrating the internal architecture of the FIG. 1 embodiment. As shown in FIG. 2. PC 102 includes network interface 202 for network access 103, and a central processing unit ("CPU") 201, that interfaces with computer bus 200. Also interfacing with computer bus 200 are fixed disk 108, random access memory ("RAM") 206 for use as main memory, read only memory ("ROM") 207, floppy disk interface 208 to allow PC 102 to interface with floppy disk drive 106, display interface 209 for interfacing with monitor 101, keyboard interface 203 for interfacing with keyboard 104, mouse interface 204 for interfacing with pointing device 105, and printer interface 205 for interfacing with printer 110.

Main memory 206 interfaces with computer bus 200 so as to provide quick RAM storage to CPU 201 during execution of software programs such as the operating system application programs, and device drivers. More specifically, CPU 201 loads computer-executable process steps from fixed disk memory media into a region of main memory 206 in order to execute software programs. Data such as color measurement data can be stored in main memory 206, where the data can be accessed by CPU 201 during execution.

Read only memory 207 stores invariant computer-executable program code, or program or process steps, for basic system functions such as basic input and output (I/O), startup, or reception of keystrokes from keyboard 104.

As also shown in FIG. 2, fixed disk 108 stores computer-executable code for application programs 210 that output color image data such as Adobe® Photoshop™.

Fixed disk 108 also stores color management module (CMM) 216. CMM 216 renders color image data from a device-dependent color space to a device-independent color space, and vice versa. CMM 216 uses measurement data from color measurement profiles to generate the device transforms necessary to transform color image data into the color space of the destination color image data.

Forward model 217 and inverse model 218 are data structures by which color behavior of a color device is modeled. Forward model 217 and inverse model 218 can be embodied into a single device driver such as printer driver 212. Inverse model 218 can be generated by computer-executable process steps which are stored on fixed disk 108 for execution by CPU 201, such as in one of application programs 210 or in CMM 216. The generation of inverse model 218 is described in more detail below.

It is also possible to implement an inverse color transform module according to the invention as a dynamic link library ("DLL"), or as a plug-in to other application programs such as image manipulation programs like the Adobe® Photoshop™ image manipulation program, or as part of printer driver 212 or monitor driver 211.

Fixed disk 108 further stores computer-executable code for monitor driver 211, printer driver 212, other device drivers 213, image files 214 and other files 215.

FIGS. 1 and 2 illustrate one example of a computing system that executes program code, or program or process steps, configured to generate a color transform using a data structure by which behavior of a color device is modeled. Other types of computing systems may also be used.

Figure 3:
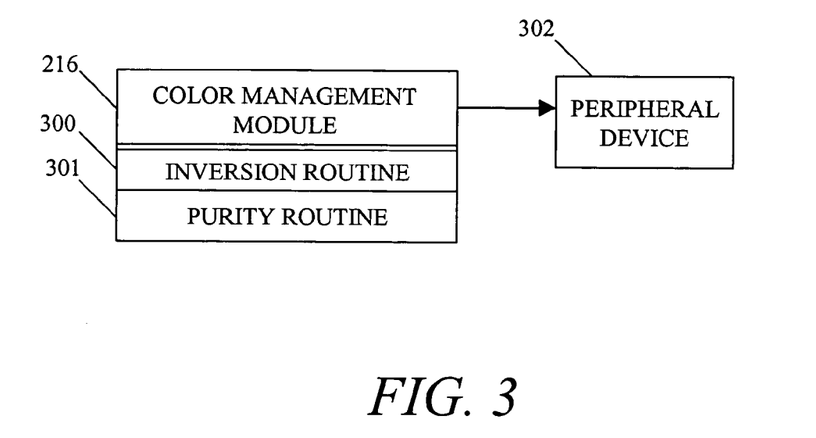
FIG. 3 is a block diagram depicting a color management module which can carry out a method of creating an inverse color transform according to the present invention.

With reference to FIG. 3, a block diagram depicting CMM 216 which creates and applies an inverse color transform according to the present invention is shown. CMM 216 can access forward model 217 and contains process steps for an inversion application 300 to invert forward model 217. CMM 216 can access inverse model 218 and contains process steps for a purity application 301 to select a device-dependent data point value set with higher purity for inverse model 218.

Inversion application 300 and purity application 301 can be embedded within CMM 216, separate application programs accessed by CMM 216, or combined into a separate application program accessed by CMM 216. In addition, image data can be outputted by CMM 216 to peripheral device 302 using inverse model 218, such as printer 110. In this embodiment, peripheral device 302 is printer 110, although a different color output device can be used.

Color characterization of peripheral device 302 generally consists of outputting a target of color patches to effect a strategic sampling of peripheral device 302. In the RGB color space, for example, the color patches of the sampled RGB output are empirically measured at a factory to obtain device-independent values in the XYZ color space. The XYZ values are then converted to device-independent values in a color space such as CIELUV, which is more perceptually linear than CIEXYZ. After converting the measurements to CIELUV, forward model 217 is built using interpolation on the RGB data, resulting in the following series of equations:

$$L = L(R, G, B)$$

$$u = u(R, G, B)$$

$$v = v(R, G, B)$$

Figure 4:
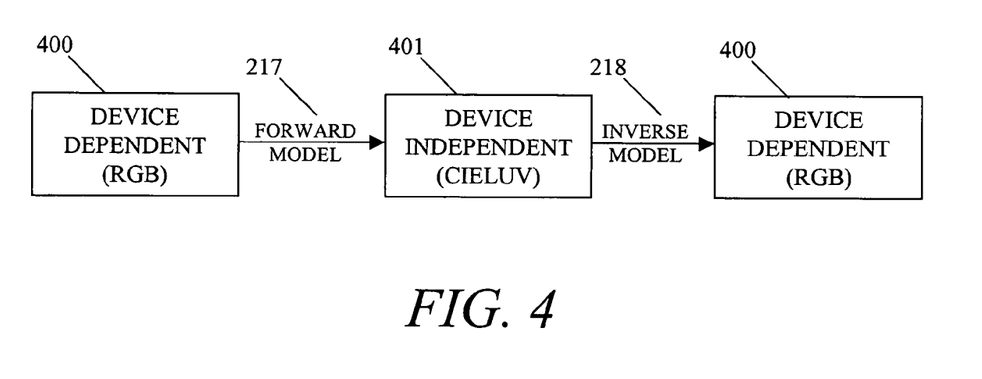
FIG. 4 is a block diagram depicting forward and inverse color transformations of a peripheral device.

Referring now to FIG. 4, a block diagram depicting the forward and inverse color transformations of peripheral device 302 is shown. Forward model 217 maps values from device-dependent color space 400 of peripheral device 302 to a device-independent color space 401. In one preferred embodiment, the device-dependent color space 400 is RGB, and the device-independent space 401 is CIELUV. However, other color spaces may be used. For example, the device-dependent color space can be CMY and the device-independent color space can be Jab or Lab. In addition, a device-dependent color space of CMYK can be used, provided that Gray Component Replacement (GCR) is performed on CMY values to obtain a K value.

CMM 216 inverts forward model 217 to create inverse model 218. Inverse model maps values from device-independent color space 401 back to device-dependent space 400 of peripheral device 302. CMM 216 is able to achieve a nearly exact inverse of forward model 217, so that when forward model 217 is applied followed by the inverse model 218, the original device-dependent color space values are recovered.

Figure 5:
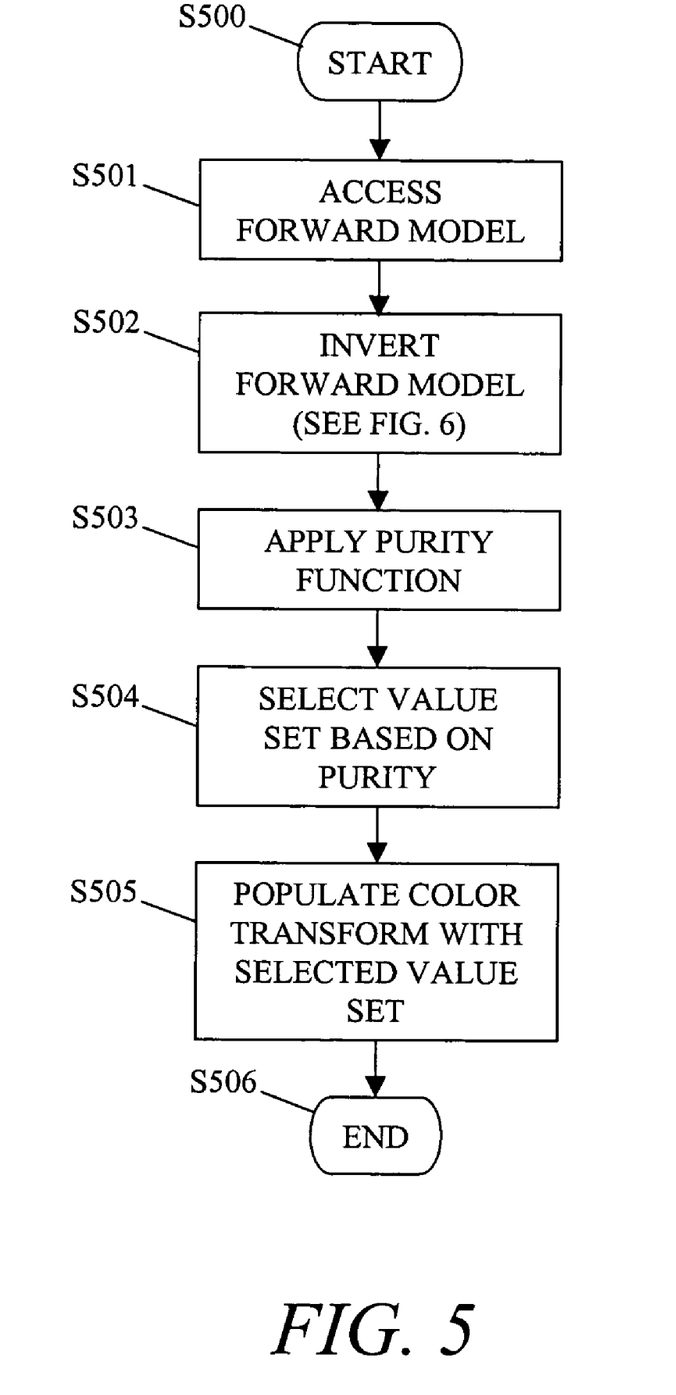
FIG. 5 is a flowchart illustrating the creation of an inverse color transform according to the present invention.

With reference to FIG. 5, a flowchart illustrating the creation of an inverse color transform according to the present invention is shown. Following start bubble S500, forward model 217 is accessed in step S501. Then, in step S502, the accessed forward model is inverted. Inversion of the forward model consists of solving, for any in-gamut color L*, u*, v* the following system of equations to obtain an RGB value corresponding to the target L*, u*, v* value:

$$L^* = L(R, G, B)$$

$$u^* = u(R, G, B)$$

$$v^* = v(R, G, B)$$

Forward model 217 is iteratively inverted to obtain a plurality of distinct device-dependent RGB data point value sets, wherein the device-dependent data point value sets are colorimetrically identical to each other in the device-independent color space. The iterative inversion of forward model 217 is explained in more detail below with relation to FIG. 6.

Figure 6:
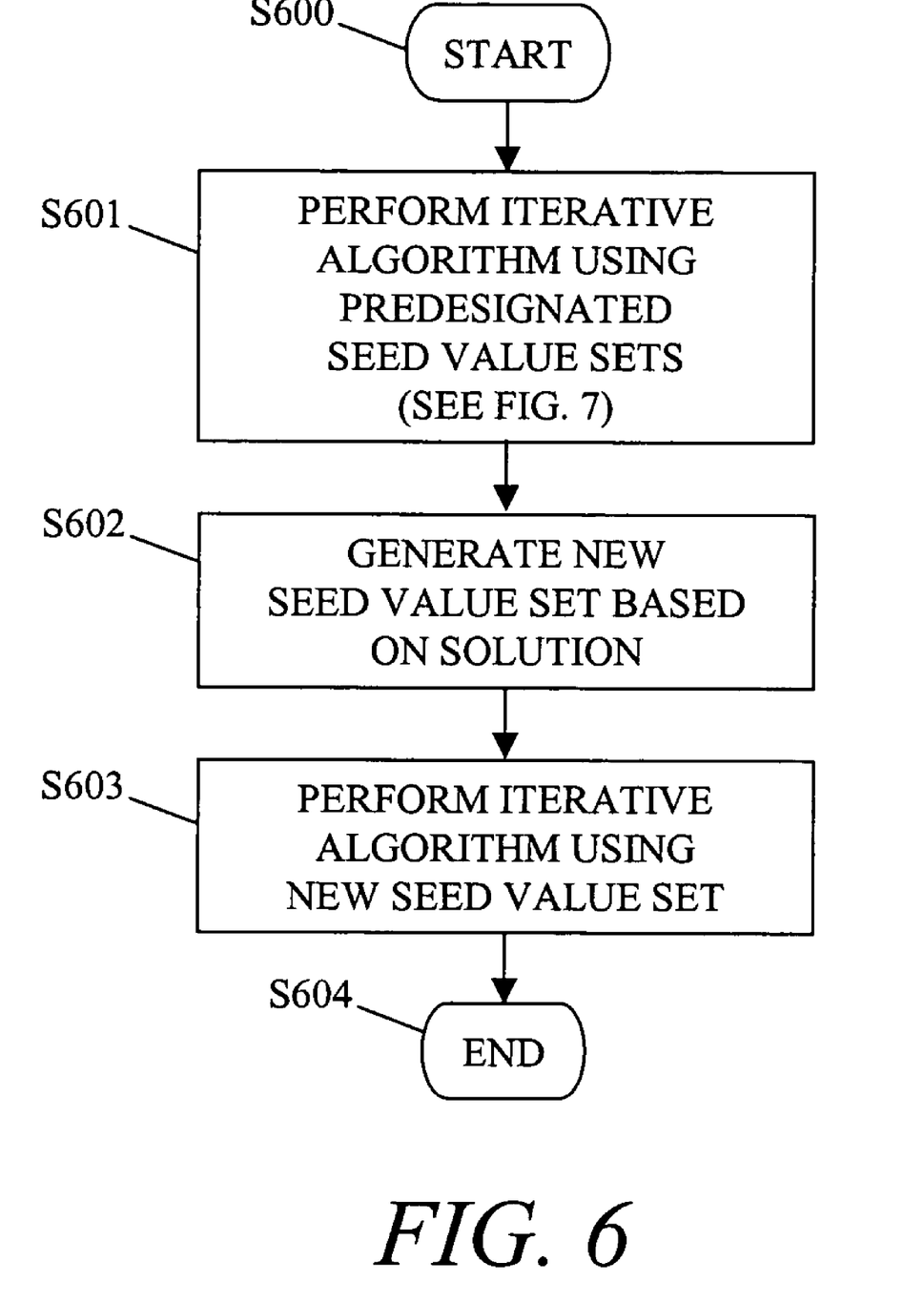
FIG. 6 is a flowchart illustrating iteratively inverting a forward model according to the present invention.

Referring to FIG. 6, a flowchart illustrating iteratively inverting forward model 217 according to the present invention is shown. Following start bubble S600, an iterative algorithm is performed in step S601 using predesignated seed value sets and device-independent data points from forward model 217 to obtain a first device-dependent data point value set. A new seed value set is generated is step S602, and the iterative algorithm is performed in step S603 with the new seed value set and device-independent data points from forward model 217 to obtain a second device-dependent data point value set.

Figure 7:
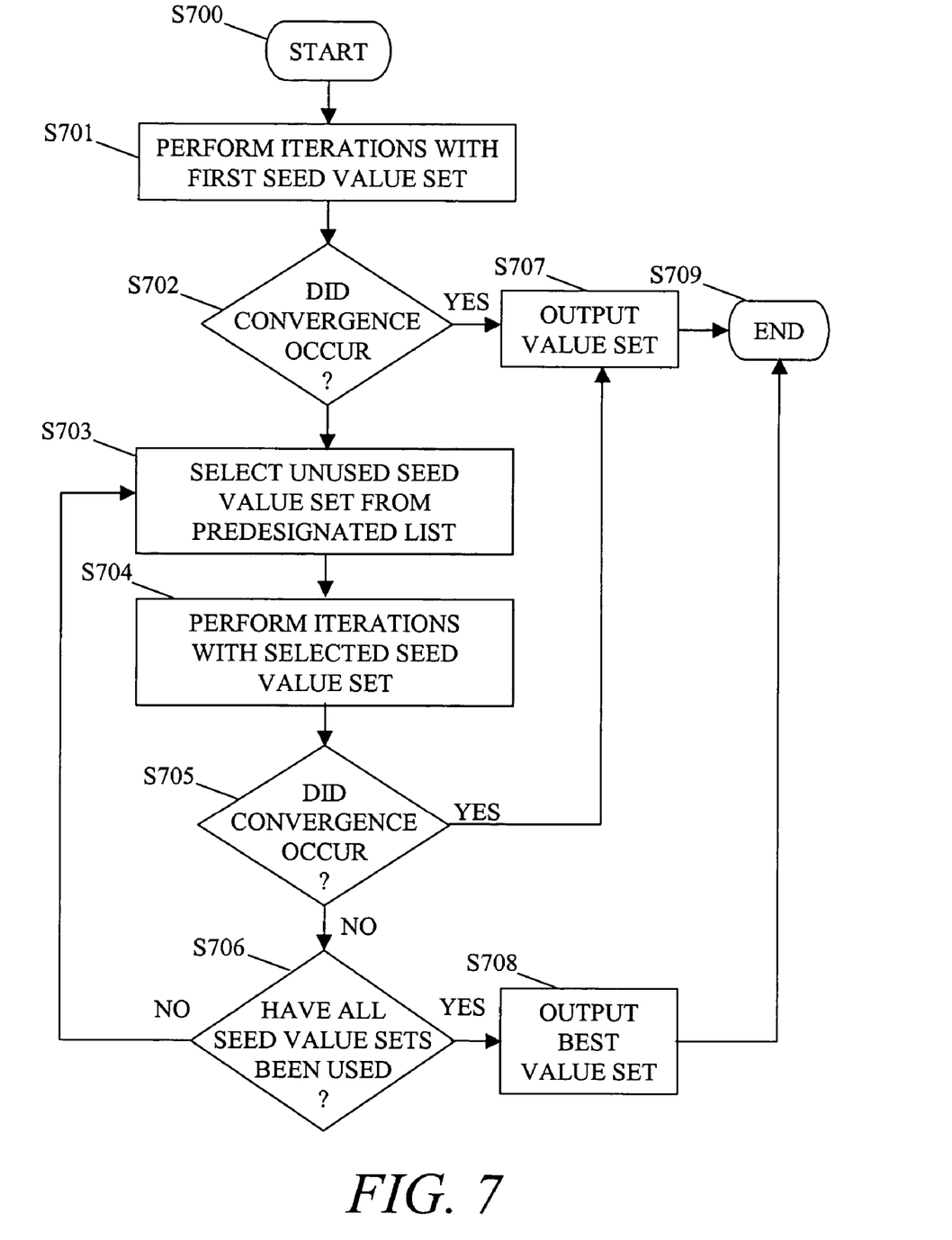
FIG. 7 is a flowchart illustrating the performance of an iterative algorithm using predesignated seed value sets according to the present invention.

FIG. 7 further illustrates step S601 of FIG. 6, in which the iterative algorithm is performed using predesignated seed value sets and device-independent data points from forward model 217. In step S701, an iterative algorithm is performed with a first seed value set. In one preferred embodiment, a simple implementation of a Newton-Raphson iterative algorithm is used. For the first seed value set, $R_0 = G_0 = B_0 = 0.3$ is provided to solve the equation for inversion of forward model 217. At an ith step of the iterative algorithm, an estimate of $R_{i+1}, G_{i+1}, B_{i+1}$ is obtained by the following formula:

$$\begin{pmatrix} R_{i+1} \\ G_{i+1} \\ B_{i+1} \end{pmatrix} = \begin{pmatrix} R_i \\ G_i \\ B_i \end{pmatrix} + \begin{pmatrix} \frac{\partial L}{\partial R} & \frac{\partial L}{\partial G} & \frac{\partial L}{\partial B} \\ \frac{\partial u}{\partial R} & \frac{\partial u}{\partial G} & \frac{\partial u}{\partial B} \\ \frac{\partial v}{\partial R} & \frac{\partial v}{\partial G} & \frac{\partial v}{\partial B} \end{pmatrix}^{-1}_{R_i, G_i, B_i} \begin{pmatrix} L^* - L(R_i, G_i, B_i) \\ u^* - u(R_i, G_i, B_i) \\ v^* - v(R_i, G_i, B_i) \end{pmatrix}$$

The iterations continue until either convergence is achieved or a maximum number of iterations is reached. Convergence occurs when error (distance in CIELUV space) is less than a preset tolerance. In one preferred embodiment, the tolerance for convergence is preset to 0.001. This value encourages more iterations to an RGB value with a more accurate solution to the iterative algorithm. If the iterative algorithm does not converge, iterations continue for a maximum number of iterations. In one preferred embodiment, the maximum number of iterations per seed value set is 10. This small value allows for better control of program execution time. In addition, the Newton-Raphson iterative algorithm tends to diverge if it does not converge within the first few iterations, so the small value saves program execution time.

In decision step S702 of FIG. 7, a decision is made as to whether or not convergence occurred with the first seed value set. If one of the iterations did converge, the device-dependent data point value set for that iteration is used as the solution to the iterative algorithm in step S707, followed by end bubble S709. Otherwise, step S703 selects an unused seed value set from the following predesignated list of thirteen seed value sets:

| | | |
|---|---|---|
| $R_0 = 0.7$ | $G_0 = 0.7$ | $B_0 = 0.7$ |
| $R_0 = 0$ | $G_0 = 0$ | $B_0 = 0.3$ |
| $R_0 = 0$ | $G_0 = 0.3$ | $B_0 = 0$ |
| $R_0 = 0.3$ | $G_0 = 0$ | $B_0 = 0$ |
| $R_0 = 0$ | $G_0 = 0.3$ | $B_0 = 0.3$ |
| $R_0 = 0.3$ | $G_0 = 0$ | $B_0 = 0.3$ |
| $R_0 = 0.3$ | $G_0 = 0.3$ | $B_0 = 0$ |
| $R_0 = 0$ | $G_0 = 0$ | $B_0 = 0.7$ |
| $R_0 = 0$ | $G_0 = 0.7$ | $B_0 = 0$ |
| $R_0 = 0.7$ | $G_0 = 0$ | $B_0 = 0$ |
| $R_0 = 0$ | $G_0 = 0.7$ | $B_0 = 0.7$ |
| $R_0 = 0.7$ | $G_0 = 0$ | $B_0 = 0.7$ |
| $R_0 = 0.7$ | $G_0 = 0.7$ | $B_0 = 0$ |

After an unused seed is selected, the Newton-Raphson iterative algorithm is performed again, using the selected seed value set and device-independent data points from forward model 217. Then, in decision step S705, a decision is made as to whether or not the iterative algorithm converged for the selected seed value set. If one of the iterations did converge, that device-dependent data point value set for that iteration is used as the solution for the iterative algorithm in step S707, followed by end bubble S709. Otherwise, a determination is made as to whether or not all seed value sets have been used. If all the seed value sets have been used, a best estimate of all the device-dependent data point value sets with smallest error is used as the solution for the iterative algorithm in step S708, followed by end bubble S709. Otherwise, step S703 is performed again, and another unused seed value set is selected from the predesignated list of seed value sets. Steps S703 to S706 repeat until convergence is achieved, or until the predesignated list of thirteen seed value sets is exhausted.

Referring back to FIG. 6, after a solution for the Newton-Raphson iterative algorithm using predesignated seed value sets is obtained, a new seed value set is generated in step S602. In one preferred embodiment, if $R_\infty$ $G_\infty$ $B_\infty$ is the obtained device-dependent data point value set, and R', G', B' represents the new seed value set, then R' is calculated as follows:

$$R' = \begin{cases} R\infty + (1 - R\infty)/2 & \text{if } R\infty < 0.8 \\ R\infty/2 & \text{if } R\infty > 0.2 \\ R\infty & \text{otherwise} \end{cases}$$

Based on the value of $R_\infty$ R' is set either closer to the boundary of the RGB cube ($R_\infty+(1-R_\infty)/2$), or closer to 0 ($R_\infty/2$). In both cases the new seed value for R' has higher purity than that of $R_\infty$. This is done in an effort to seed the inversion function with a value that will result in a converged value that has greater color purity than that of $R_\infty$ $G_\infty$ $B_\infty$. Similar formulas are used for calculating the values of G' and B'. If the R', G', B' values differ from the $R_\infty$ $G_\infty$ $B_\infty$ values, the iterative algorithm is performed again in step S603, using the R', G', B' values to obtain a second device-dependent data point value set $R'_\infty$, $G'_\infty$, $B'_\infty$. $R'_\infty$, $G'_\infty$, $B'_\infty$ represents a device-dependent data point value set that is colorimetrically identical to the first obtained device-dependent data point value set $R_\infty$ $G_\infty$ $B_\infty$.

In one preferred embodiment, two distinct device-dependent data point value sets are obtained that are colorimetrically identical to each other in the device-independent color space. However, other methods for inversion may be used so long as two or more distinct device-dependent data point value sets are obtained that are colorimetrically identical in the device-independent color space.

Referring to FIG. 5, after forward model 217 is iteratively inverted, a purity function is applied in step S503 to both the first obtained device-dependent data point value set $R_\infty$ $G_\infty$ $B_\infty$ and the second device-dependent data point value set $R'_\infty$, $G'_\infty$, $B'_\infty$, as follows:

$$\text{Purity}(R, G, B) = \phi(R) + \phi(G) + \phi(B)$$

where $$\phi(R) = \begin{cases} 1 & \text{if } R < 0.5/255 \\ & \text{or } R > 254.5/255 \\ 0 & \text{otherwise} \end{cases}$$

In step S504, $R'_\infty$, $G'_\infty$, $B'_\infty$ will be accepted as the better solution if its error is not larger than that of $R_\infty$ $G_\infty$ $B_\infty$ and it has a higher purity based on the applied purity function.

If more than two distinct device-dependent data point value sets are obtained that are colorimetrically identical in the device-independent color space, then the purity function is performed for each of the device-dependent data point value sets, followed by a selection of one device-dependent data point value set based on smaller error and higher purity.

Then, in step S505, the inverse color transform is populated with the selected device-dependent data point value set, followed by end bubble S506.

Since a device-dependent data point value set is selected from a plurality of obtained device-dependent data point value sets based on the application of a color purity function, a best color estimate among all color candidates that are colorimetrically equivalent is provided. In addition, inverse model 218 is nearly an exact inverse of the forward model 217, so that when forward model 217 is applied followed by inverse model 218, the original device-dependent color space values are recovered.

The invention has been described above with respect to particular illustrative embodiments. It is understood that the invention is not limited to the above-described embodiments and that various changes and modifications may be made by those skilled in the relevant art without departing from the spirit and scope of the invention.

What is claimed is:

1. A method for creating a color transform for transforming color image data from a device-independent color space to a device-dependent color space of a color device, the method comprising the steps of:
    accessing a forward model which transforms color image data from the device-dependent color space to the device-independent color space;
    iteratively inverting the forward model to obtain a plurality of distinct device-dependent data point value sets for one device-independent value set in the forward model;
    calculating color purity of each of the plurality of distinct device-dependent data point value sets;
    selecting one device-dependent data point value set from the plurality of distinct device-dependent data point value sets based on the calculated color purity; and
    populating the color transform with the selected device-dependent data point value set.

2. A method according to claim 1, wherein the plurality of distinct device-dependent data point value sets comprise at least one initial device-dependent data point value set and at least one subsequent device-dependent data point value set, wherein the at least one subsequent device-dependent data point value set is based on the at least one initial device-dependent data point value set, and wherein the at least one subsequent device-dependent data point value set is moved closer to pure color values.

3. A method according to claim 1, wherein the step of iteratively inverting the forward model comprises performing an iterative algorithm using device-independent data points from the forward model and using a plurality of different seed value sets to obtain the plurality of distinct device-dependent data point value sets.

4. A method according to claim 3, wherein the iterative algorithm is a Newton-Raphson iterative algorithm.

5. A method according to claim 1, wherein the steps of accessing, iteratively inverting, selecting, calculating and populating are repeatedly performed to further populate the color transform.

6. A method according to claim 1, wherein color purity is calculated based on a proximity of the distinct device-dependent data point value sets to a boundary of the device-dependent color space.

7. A method according to claim 1, wherein the color transform creates a one-to-one mapping from the device-independent color space to the device-dependent color space.

8. A method according to claim 1, wherein the color transform is usable by a color management system.

9. A method according to claim 1, wherein the device-dependent color space is RGB.

10. A method according to claim 1, wherein the device-independent color space is CIELUV.

11. A method according to claim 1, wherein the device-independent color space is Jab.

12. A method according to claim 1, wherein the color device is a printer.

13. A method according to claim 1, wherein the color device is a monitor.

14. A method according to claim 1, wherein all of the plurality of device-dependent data point value sets are colorimetrically identical to each other in the device-independent color space.

15. Computer-executable process steps stored on a computer readable medium, said computer-executable process steps for causing a computer to create a color transform for transforming color image data from a device-independent color space to a device-dependent color space of a color device, said computer-executable process steps comprising process steps executable by the computer to perform a method according to any one of claims 1 to 13 or 14.

16. A computer-readable medium which stores computer-executable process steps, the computer-executable process steps for causing a computer to create a color transform for transforming color image data from a device-independent color space to a device-dependent color space of a color device, said computer-executable process steps comprising process steps executable by the computer to perform a method according to any one of claims 1 to 13 or 14.

17. A method for creating an inverse color transform for transforming color image data from a device-independent color space to a device-dependent color space of a color device, the method comprising the steps of:
accessing a forward model which transforms color image data from the device-dependent color space to the device-independent color space;
performing an iterative algorithm using predesignated initial device-dependent data point values and using one device-independent data point value set from the forward model to obtain a first set of device-dependent data point values;
generating new initial device-dependent data point values based on the obtained first set of device-dependent data point values;
performing the iterative algorithm using the generated new initial device-dependent data point values and using said one device-independent data point value set from the forward model to obtain a second set of device-dependent data point values;
calculating color purity of the first set of device-dependent data point values and the second set of device-dependent data point values;
selecting between the first set of device-dependent data point values and the second set of device-dependent data point values based on the calculated color purities of the first set of device-dependent data point values and the second set of device-dependent data point values; and
populating the inverse color transform with the selected set of device-dependent data point values.

18. A method according to claim 17, wherein the new initial device-dependent data point values are generated based on the set of obtained first output device-dependent data point values, and wherein the new initial device-dependent data point values are moved closer to pure color values.

19. A method according to claim 17, wherein the iterative algorithm is performed on one set of predesignated initial device-dependent data point values selected from a plurality of sets of predesignated initial device-dependent data point values.

20. A method according to claim 19, wherein the plurality of sets of predesignated initial device-dependent data point values comprises thirteen sets.

21. A method according to claim 19, wherein the iterative algorithm is performed on the selected set until convergence is achieved, wherein convergence is based on obtaining device-dependent data point values that are within a preset tolerance limit of error.

22. A method according to claim 19, wherein the iterative algorithm is performed on the selected set for a preset number of iterations when convergence is not achieved.

23. A method according to claim 22, wherein the iterative algorithm is repeatedly performed on subsequent sets selected from the plurality of sets of predesignated initial device-dependent data point values.

24. A method according to claim 22, wherein if the iterative algorithm is performed on all sets within the plurality of sets of predesignated initial device-dependent data point values without achieving convergence, a best estimate is used as the first output device-dependent data point values.

25. A method according to claim 17, wherein the iterative algorithm is a Newton-Raphson iterative algorithm.

26. A method according to claim 17, wherein the steps of accessing, performing, generating, performing, calculating, selecting and populating are repeatedly performed to further populate the inverse color transform.

27. A method according to claim 17, wherein color purities are calculated based on a proximity of the first set of device-dependent data point values and the second set of device-dependent data point values to a boundary of the device-dependent color space.

28. A method according to claim 17, wherein the inverse color transform creates a one-to-one mapping from the device-independent color space to the device-dependent color space.

29. A method according to claim 17, wherein the inverse color transform is usable by a color management system.

30. A method according to claim 17, wherein the device-dependent color space is RGB.

31. A method according to claim 17, wherein the device-independent color space is CIELUV.

32. A method according to claim 17, wherein the device-independent color space is Jab.

33. A method according to claim 17, wherein the color device is a printer.

34. A method according to claim 17, wherein the color device is a monitor.

35. A method according to claim 17, wherein both of the first and second sets of device-dependent data point values are colorimetrically identical to each other in the device-independent color space.

36. Computer-executable process steps stored on a computer readable medium, said computer-executable process steps causing a computer to create an inverse color transform for transforming color image data from a device-independent color space to a device-dependent color space of a color device, said computer-executable process steps comprising process steps executable by the computer to perform a method according to any one of claims 17 to 34 or 35.

37. A computer-readable medium which stores computer-executable process steps, the computer-executable process steps for causing a computer to create an inverse color transform for transforming color image data from a device-independent color space to a device-dependent color space of a color device, said computer-executable process steps comprising process steps executable by the computer to perform a method according to any one of claims 17 to 34 or 35.

* * * * *